US007341534B2

(12) United States Patent
Schmidt

(10) Patent No.: US 7,341,534 B2
(45) Date of Patent: Mar. 11, 2008

(54) ELECTRICALLY VARIABLE HYBRID TRANSMISSION AND POWERTRAIN

(75) Inventor: Michael R. Schmidt, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 182 days.

(21) Appl. No.: 11/218,049

(22) Filed: Sep. 1, 2005

(65) Prior Publication Data

US 2007/0049443 A1 Mar. 1, 2007

(51) Int. Cl.
*F16H 3/72* (2006.01)
*F16H 37/06* (2006.01)

(52) U.S. Cl. ............................ 475/5; 475/4; 180/65.6; 903/911

(58) Field of Classification Search .................... 475/4, 475/5; 180/65.1-65.4, 65.6, 65.7; 903/909-911
See application file for complete search history.

(56) References Cited

U.S. PATENT DOCUMENTS 2,660,861 A * 12/1953 Schmitt ....................... 60/703
4,126,200 A 11/1978 Miller et al.
4,582,185 A 4/1986 Grimes et al.
5,024,633 A 6/1991 Schmidt
5,577,973 A * 11/1996 Schmidt ........................ 475/5
5,603,671 A 2/1997 Schmidt
6,595,884 B1 * 7/2003 Ai et al. ........................ 475/5
7,108,626 B2 * 9/2006 Friedmann ..................... 475/8

FOREIGN PATENT DOCUMENTS

JP 02203050 A * 8/1990

* cited by examiner

*Primary Examiner*—Tisha Lewis

(57) ABSTRACT

Provided for a vehicle is an electrically variable hybrid transmission and powertrain utilizing a flywheel for energy storage. The flywheel is connected to an output shaft of the transmission and a first electric power unit through two planetary gear sets. Also provided is a second electrical power unit selectively coupled to an input shaft of the transmission and continuously coupled to an output shaft of a mechanical power source. The transmission, first and second electrical power units, flywheel, and mechanical power source cooperate to provide a continuously variable rotational speed to a final drive to propel the hybrid powertrain equipped vehicle.

17 Claims, 2 Drawing Sheets

10
12
14
16
18
20
22
24
26
28
30
32
34
36
38
40
42
44
46
48
50
52
54
56
58
60
62
64
66
68
70
72
74
76
78

ELECTRICALLY VARIABLE HYBRID TRANSMISSION AND POWERTRAIN

TECHNICAL FIELD

This invention relates to hybrid vehicular powertrains.

BACKGROUND OF THE INVENTION

The electrically variable hybrid transmission (EVT) system has been proposed for vehicles to improve fuel economy and reduce emissions. The EVT system splits mechanical power between an input shaft and an output shaft of a transmission into a mechanical power path and an electrical power path by differential gearing. The mechanical power path may include torque transmitting mechanisms, such as clutches and brakes, and gears. The electrical power path may employ two electrical power units, each of which may operate as a motor or as a generator. With an energy storage device such as a chemical battery, the EVT system can be incorporated into a hybrid vehicular powertrain for hybrid vehicles. Additional energy storage devices may be incorporated such as flywheel batteries, which use the inertia of a rotating flywheel to store kinetic energy. The kinetic energy is subsequently transformed into electrical energy by employing the rotating flywheel to operate a generator. Traditionally, the flywheel battery is remotely mounted from the EVT system.

SUMMARY OF THE INVENTION

An electrically variable powertrain is provided including a transmission having an output shaft and a first planetary gear set having first, second, and third members. The second member of the first planetary gear set is continuously interconnected with the output shaft. Also provided is a first electrical power unit, which may be a motor/generator unit, continuously connected with the first member of the first planetary gear set. Additionally, a second planetary gear set having first, second, and third members with the second member being continuously interconnected with the third member of the first planetary gear set. A flywheel is continuously interconnected with the first member of the second planetary gear set, and disposed in concentric relation to the output shaft.

The third member of the second planetary gear set may be locked or grounded. The transmission of the present invention may be an automatically shiftable power transmission. The electrically variable powertrain of the present invention may also include a mechanical power source having an output shaft and operable to supply mechanical power to the output shaft. An input shaft connected with the transmission may be provided. The input shaft is selectively rotatably connectable to the output shaft of the mechanical power source. Additionally, a second electrical power unit, which may be a motor/generator unit, may be provided that is continuously connected with respect to the output shaft of the mechanical power source for unitary rotation therewith. An electronic control unit may be provided in electrical communication with the first and second electrical power units. A hydrodynamic drive device may be disposed between, and operable to selectively couple the output shaft of the mechanical power source and the input shaft of the transmission. The hydrodynamic drive device may be a torque converter having a pump section continuously connected with the output shaft of the mechanical power source, a stator, and a turbine section continuously connected with the input shaft of the transmission. A lock up clutch disposed between the output shaft of the mechanical power source and the input shaft of the transmission may be provided.

Another aspect of the present invention provides an electrically variable hybrid transmission system including an automatically shiftable power transmission having an input shaft and an output shaft. Also provided is a rotatable flywheel disposed in concentric relation with respect to the output shaft and at least one electrical power unit. Additionally, a first planetary gear set having a first, second, and third member is provided. The first member is continuously interconnected with a first of the at least one electrical power unit and the second member is continuously interconnected with the output shaft of the automatically shifting power transmission. A second planetary gear set having a first, second, and third member is provided. The first member is continuously interconnected with the flywheel, the second member is continuously interconnected with the third member of the first planetary gear set, and the third member is locked or grounded.

At least one other electrical power unit may be provided selectively coupled to the input shaft of the automatically shiftable power transmission for substantially unitary rotation therewith. A hydrodynamic drive device may be provided that is operable to selectively couple the other electrical power unit to the input shaft of the automatically shiftable power transmission.

Yet another aspect of the present invention provides an electrically variable hybrid transmission system including an automatically shiftable power transmission having an input shaft and an output shaft. A rotatable flywheel disposed in concentric relation with respect to the output shaft is provided. Additionally, first and second electrical power units are provided with an electronic control unit in electrical communication with the first and second electrical power units. The second electrical power unit is selectively coupled to the input shaft of the automatically shiftable power transmission for substantially unitary rotation therewith by a hydrodynamic drive device. The electrically variable hybrid transmission system of the present invention also includes a first planetary gear set having a first, second and third member. The first member is continuously interconnected with the first electrical power unit and the second member is continuously interconnected with the output shaft of the automatically shiftable power transmission. Also provided is a second planetary gear set having a first, second, and third member. The first member is continuously interconnected with the flywheel, the second member is continuously interconnected with the third member of the first planetary gear set, and the third member is locked or grounded.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
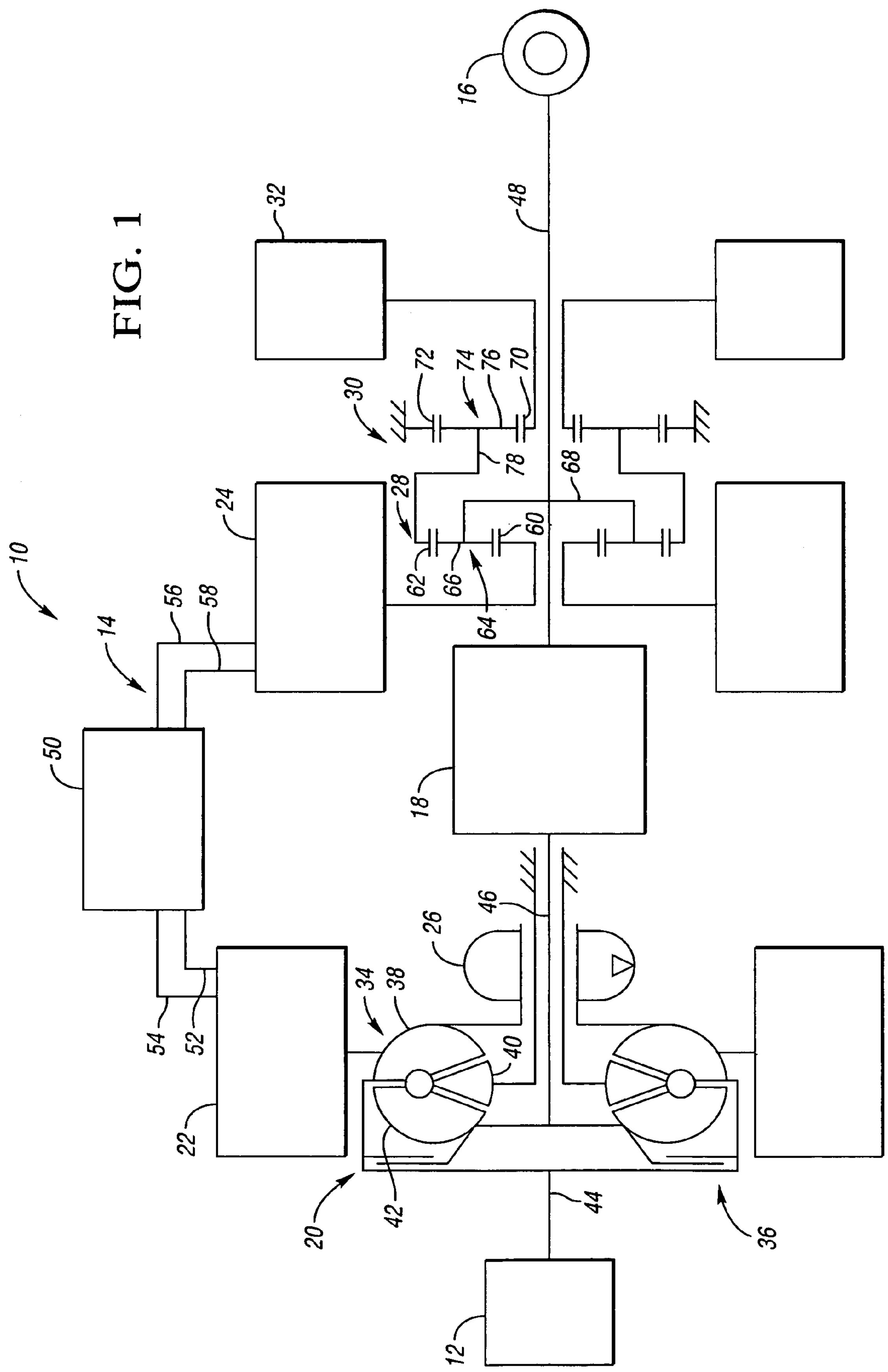
FIG. 1 is a schematic representation of a electrically variable hybrid powertrain illustrating the aspects of the present invention.

Referring to the drawings, there is seen in FIG. 1 an electrically variable hybrid powertrain 10 incorporating an engine 12, an electrically variable hybrid transmission system 14, and a final drive 16.

The electrically variable hybrid transmission system 14 includes an automatically shiftable transmission 18, a hydrodynamic drive device 20, a pair of electrical power units 22 and 24, a main pump 26, a first planetary gear set 28, a second planetary gear set 30, and a flywheel 32. The hydrodynamic drive device 20 includes a fluid coupling such as a torque converter 34, and a lock up clutch 36. The lock up clutch 36 is provided to boost the efficiency of the hydrodynamic drive device 20 by reducing the slip losses within the torque converter 34. The lock up clutch 36 is preferably an electronically controlled compliance clutch, or ECCC. The ECCC allows a small amount of slip to occur across the lock up clutch 36 to decouple the firing pulses of the engine 12 from the rest of the electrically variable hybrid powertrain 10. One such system is disclosed in U.S. Pat. No. 4,582,185 to Grimes et al., issued Apr. 15, 1986 and assigned to the assignee of the present invention, which is hereby incorporated by reference in its entirety. The torque converter 34 has a pump section 38, a stator section 40, and a turbine section 42. An output shaft 44 of the engine 12 is continuously connected to the pump section 38, the electrical power unit 22, and the main pump 26 for unitary rotation therewith. An input shaft 46 of the automatic transmission 18 is continuously connected to the turbine section 42 of the toque converter 34.

As the engine 12 drives the output shaft 44, the pump section 38 of the toque converter 34 will force fluid into the turbine section 42 thereby causing rotation of the turbine section 42 and the input shaft 46 connected therewith. The stator 40 provides torque multiplication by directing fluid from the turbine section 42 into the pump section 38. The engine 12 is preferably an internal combustion engine, such as a spark ignited or compression ignited engine. The lock up clutch 36 is engaged to couple the output shaft 44 of the engine 12 with the input shaft 46 of the transmission 18 for substantially unitary rotation when the relative rotational speed between the pump section 38 and the turbine section 42 are substantially similar. The main pump 26 is operable to provide pressurized fluid to effect engagement of torque transmitting mechanisms (not shown) contained within the automatic transmission 18. Additionally, the main pump 26 provides lubrication to the automatic transmission 18.

The automatic transmission 18 has a plurality of selectively establishable gear ratios between the engine 12 and the final drive 16. These ratios are generally established by hydraulically operated torque transmitting mechanisms (not shown), such as clutches and brakes. The engagement and disengagement of these torque transmitting mechanisms are controlled by valve mechanisms (not shown) which direct hydraulic fluid to and from the operating piston of the devices. An output shaft 48 of the automatic transmission 18 is operable to provide drive torque to the final drive 16.

An electronic control unit 50 provides control to the electrical power units 22 and 24. The electronic control unit 50 is in electrical communication with the electrical power unit 22 through a pair of electrical conductors 52 and 54 and is in electrical communication with the electrical power unit 24 through a pair of electrical conductors 56 and 58. The electrical power units 22 and 24 are preferably motor/generator units, which can operate as either a power supplier (motor) or a power generator. When either is operating as a motor or power supplier, the electrical power units 22 and 24 will supply power to the automatic transmission 18. When either is operating as a generator, the electrical power units 22 and 24 will take electrical power from the automatic transmission 18. The electronic control unit 50 receives a number of inputs from the vehicle, the engine 12, and the automatic transmission 18. These inputs may include engine speed, vehicle speed, and intake manifold air pressure to name a few. These inputs are used as input signals for a programmable-type digital computer, which is incorporated within the electronic control unit 50. The electronic control unit 50 is then effective to distribute control signals to allow the electrically variable hybrid transmission system 14 to operate in a controlled manner.

The planetary gear set 28 includes a sun gear member 60, a ring gear member 62, and a planet carrier assembly member 64. The planet carrier assembly member 64 includes a plurality of pinion gear members 66 that are rotatably mounted on a planet carrier 68 and disposed in meshing relationship with both the sun gear member 60 and the ring gear member 62.

The planetary gear set 30 includes a sun gear member 70, a ring gear member 72, and a planet carrier assembly member 74. The planet carrier assembly member 74 includes a plurality of pinion gear members 76 that are rotatably mounted on a planet carrier 78 and disposed in meshing relationship with both the sun gear member 70 and the ring gear member 72.

The electrical power unit 24 is operatively connected to the sun gear member 60 for unitary rotation therewith. The planet carrier 68 is operatively connected to the output shaft 48 for unitary rotation therewith. The ring gear 62 is operatively connected to the planet carrier 78 for unitary rotation therewith. The sun gear 70 is operatively connected to the flywheel 32 for unitary rotation therewith. The ring gear 72 is grounded or held stationary. It should be noted that, where used in the claims, first, second, and third members of the planetary gear sets do not necessarily refer to a member of a particular type; thus, for example, a first member might be any one of a ring gear member, a sun gear member, or a planet carrier. Similarly, as used in the claims, the respective first, second, or third members of two or more gear sets may or may not be the same type of member.

Figure 2:
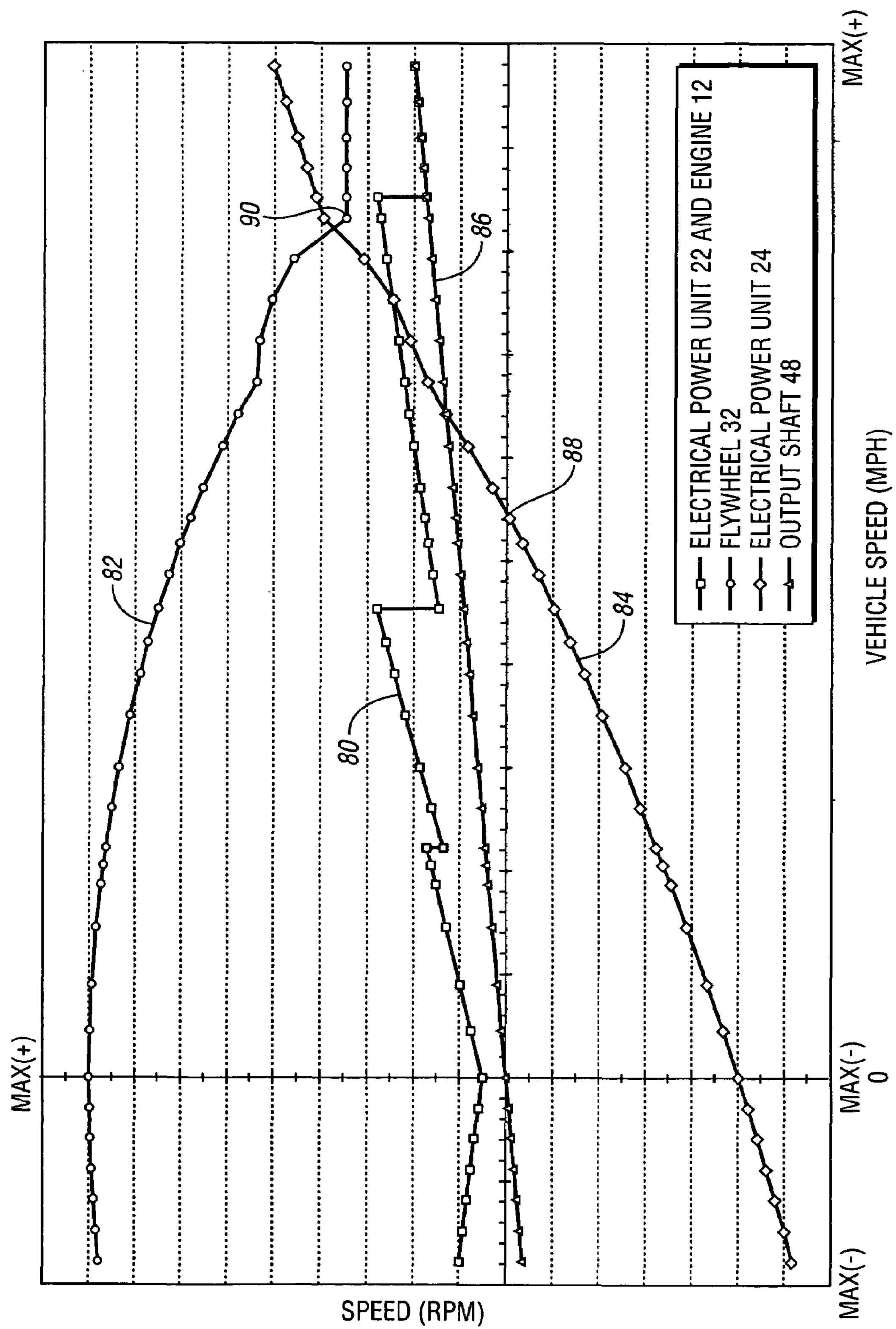
FIG. 2 is a graphical representation illustrating the rotational speeds of various components within the electrically variable powertrain of FIG. 1 versus the speed of the hybrid vehicle.

FIG. 2 is a graphical depiction of the rotational speed (RPM) of components within the electrically variable powertrain 10 versus the vehicle speed (MPH) of the hybrid vehicle. Referring now to FIGS. 1 and 2, the rotational speed of the engine 12 and consequently the rotational speed of electrical power unit 22 is depicted by curve 80, the rotational speed of the flywheel 32 is depicted by curve 82, the rotational speed of the electrical power unit 24 is depicted by curve 84, and the rotational speed of the output shaft 48 of the automatic transmission 18 is depicted by curve 86. The rotational direction of the engine 12 will be considered forward or positive, while the rotational direction opposite the engine 12 will be considered reverse or negative. The curves shown in FIG. 2 are for maximum power flow through the vehicle. That is, the engine 12 is operated at its maximum load condition and each of the electrical power units 22 and 24 is operating at its maximum electrical generation and/or power output conditions.

When operating the vehicle in reverse, i.e. negative vehicle speeds, the speed of the engine 12 and the electrical power unit 22 increases from an idle point as shown by curve 80. In the reverse mode, the output shaft 48 will rotate in a negative direction and will cause the vehicle to move in reverse. The electrical power unit 24 will operate as a generator providing electrical power to the electrical power unit 22, which is operating as a motor.

When operating the vehicle in the forward range mode of operation, the rotational speed of the engine 12 and the electrical power unit 22 will increase from an idle speed condition as illustrated by curve 80. The step like nature of the curve 80 is a result of the lock-up clutch 36 engaging at different gear ratios of the automatic transmission 18. The rotational speed of the output shaft 48 will increase, as illustrated by curve 86, propelling the vehicle forward. The rotational speed of the flywheel 32 will decrease, as illustrated by curve 82, transferring the kinetic energy of rotation to the electrical power unit 24 through the planetary gear sets 28 and 30. The electrical power unit 24, operating as a generator provides electrical power to the electrical power unit 22, which is operating as a motor, via the electronic control unit 50. When operating the vehicle at speeds represented by point 88, shown in FIG. 2, the electrical power unit 24 switches from operating as a generator and begins operating as a generator. Concurrently, the electrical power unit 22 switches from operating as a motor to operating as a generator. The flywheel 32 will continue to provide power to the electrically variable powertrain 10 until point 90, shown in FIG. 2. At point 90, the electrical power units 22 and 24 operate as generators.

While the best modes for carrying out the invention have been described in detail, those familiar with the art to which this invention relates will recognize various alternative designs and embodiments for practicing the invention within the scope of the appended claims.

The invention claimed is:

1. An electrically variable powertrain comprising:

a transmission having an output shaft;

a first planetary gear set having first, second, and third members, said second member being continuously interconnected with said output shaft;

a first electrical power unit continuously connected with said first member of said first planetary gear set;

a second planetary gear set having first, second, and third members with said second member being continuously interconnected with said third member of said first planetary gear set, wherein said third member of said second planetary gear set is continuously locked or grounded; and a flywheel continuously interconnected with said first member of said second planetary gear set, and disposed in concentric relation to said output shaft.

2. The electrically variable powertrain of claim 1, wherein said transmission is an automatically shiftable power transmission.

3. The electrically variable powertrain of claim 1, further comprising:

a mechanical power source having an output shaft, said mechanical power source being operable to supply mechanical power to said output shaft;

an input shaft connected with said transmission, said input shaft being selectively rotatably connectible to said output shaft of said mechanical power source; and a second electrical power unit continuously connected with respect to said output shaft of said mechanical power source for unitary rotation therewith.

4. The electrically variable powertrain of claim 3, further comprising:

an electronic control unit; and wherein said first and second electrical power units are in electrical communication with said electronic control unit.

5. The electrically variable powertrain of claim 3, wherein at least one of said first and second electrical power units is a motor generator unit.

6. The electrically variable powertrain of claim 3, further comprising:

a hydrodynamic drive device disposed between, and operable to selectively couple said output shaft of said mechanical power source and said input shaft of said transmission.

7. The electrically variable powertrain of claim 6, further comprising:

said hydrodynamic drive device being a torque converter having a pump section continuously connected with said output shaft of said mechanical power source, a stator, and a turbine section continuously connected with said input shaft of said transmission; and a lock up clutch disposed between said output shaft of said mechanical power source and said input shaft of said transmission.

8. The electrically variable powertrain of claim 1, wherein said first member of said first and second planetary gear set is a sun gear member, said second member of said first and second planetary gear set is a planet carrier member, and said third member of said first and second planetary gear set is a ring gear member.

9. An electrically variable hybrid transmission system comprising:

an automatically shiftable power transmission having an input shaft and an output shaft;

a rotatable flywheel disposed in concentric relation with respect to said output shaft;

at least one electrical power unit;

a first planetary gear set having a first, second and third member, said first member being continuously interconnected with a first of said at least one electrical power unit, said second member being continuously interconnected with said output shaft of said automatically shifting power transmission; and a second planetary gear set having a first, second, and third member, said first member being continuously interconnected with said flywheel, said second member being continuously interconnected with said third member of said first planetary gear set, said third member being continuously locked or grounded.

10. The electrically variable hybrid transmission system of claim 9, further comprising:

at least another electrical power unit selectively coupled to said input shaft of said automatically shiftable power transmission for substantially unitary rotation therewith.

11. The electrically variable hybrid transmission system of claim 10, further comprising:

a hydrodynamic drive device operable to selectively couple said another electrical power unit to said input shaft of said automatically shiftable power transmission.

12. The electrically variable hybrid transmission system of claim 9, wherein said at least one electrical power unit is a motor/generator unit.

13. The electrically variable hybrid transmission system of claim 10, further comprising:

an electronic control unit in electrical communication with at least one of said electrical power units.

14. The electrically variable hybrid transmission system of claim 9, wherein said first member of said first and second planetary gear set is a sun gear member, said second member of said first and second planetary gear set is a planet carrier member, and said third member of said first and second planetary gear set is a ring gear member.

15. An electrically variable hybrid transmission system comprising:

an automatically shiftable power transmission having an input shaft and an output shaft;

a rotatable flywheel disposed in concentric relation with respect to said output shaft;

a first and a second electrical power unit;

an electronic control unit in electrical communication with said first and second electrical power units;

wherein said second electrical power unit is selectively coupled to said input shaft of said automatically shiftable power transmission for substantially unitary rotation therewith by a hydrodynamic drive device;

a first planetary gear set having a first, second and third member, said first member being continuously interconnected with said first electrical power unit, said second member being continuously interconnected with said output shaft of said automatically shiftable power transmission; and a second planetary gear set having a first, second, and third member, said first member being continuously interconnected with said flywheel, said second member being continuously interconnected with said third member of said first planetary gear set, said third member being locked or grounded.

16. The electrically variable hybrid transmission system of claim 15 wherein said first and second electrical power units are motor/generator units.

17. The electrically variable hybrid transmission system of claim 15, wherein said first member of said first member of said first and second planetary gear set is a sun gear member, said second member of said first and second planetary gear set is a planet carrier member, and said third member of said first and second planetary gear set is a ring gear member.

* * * * *